2,787,919

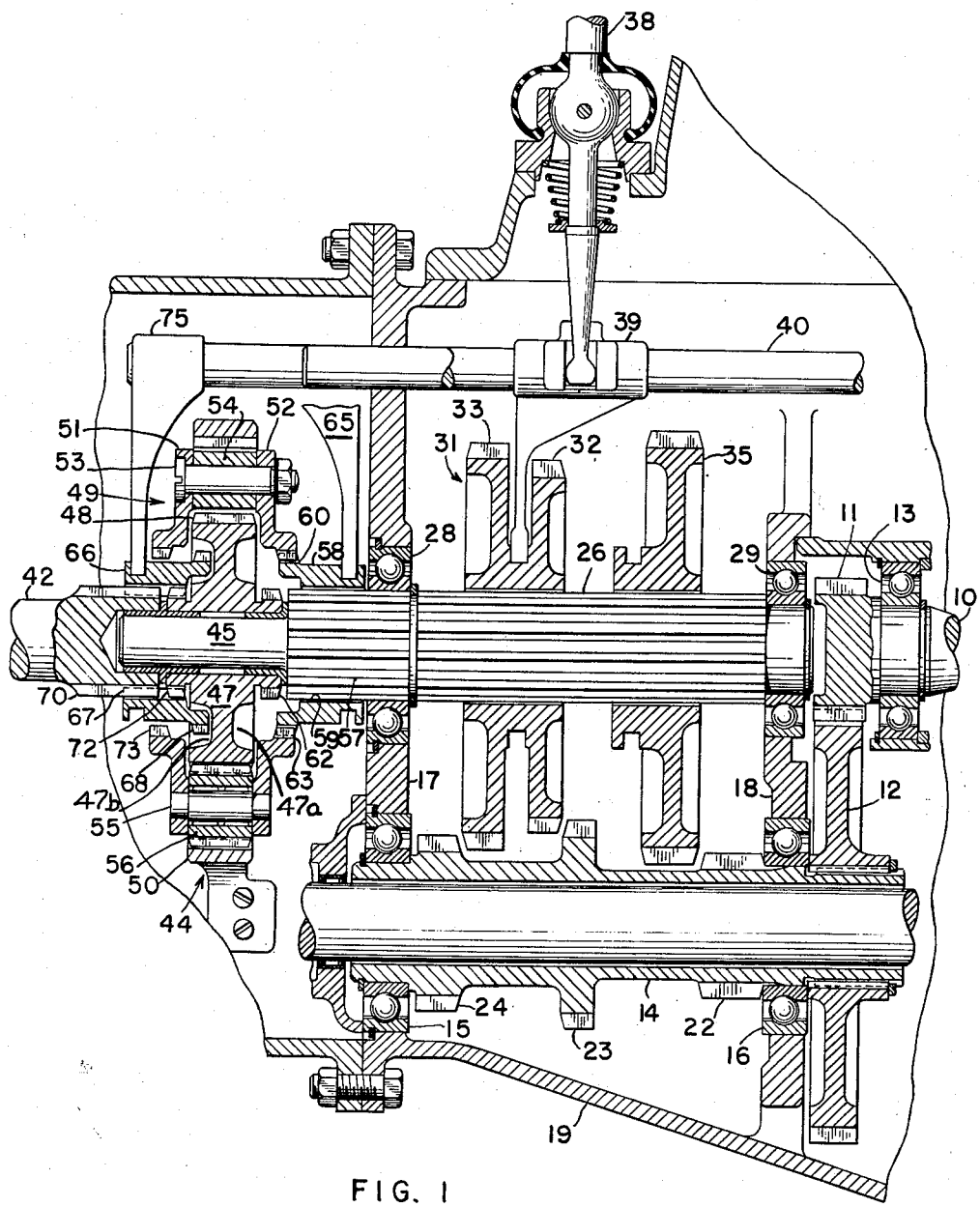
April 9, 1957    A. SENKOWSKI ET AL    2,787,919
CHANGE SPEED PLANETARY TRANSMISSION
Filed April 6, 1955
FIG. I
INVENTORS:
Alexander Senkowski &
BY Arthur Edward Lynes
James E. Nilles
Attorney United States Patent Office 2,787,919
Patented Apr. 9, 1957

CHANGE SPEED PLANETARY TRANSMISSION

Alexander Senkowski, Coventry, and Arthur E. Lynes, Sutton Coldfield, England, assignors to Massey-Harris-Ferguson Inc., Racine, Wis., a corporation of Maryland Application April 6, 1955, Serial No. 499,714

Claims priority, application Great Britain April 9, 1954

2 Claims. (Cl. 74—750)

This invention relates to transmissions and, more specifically, to an epicyclic gear unit having a dual clutching arrangement, which finds particular utility in conjunction with change speed gearing for farm tractors.

A tractor having a wide choice of gear ratios is especially useful for modern mechanised farming. The low range of gear ratios can be adopted for slow heavy work, for instance trailing a combine harvester; the medium range can be adopted for ordinary agricultural work, for instance ploughing; the high range can be used for travelling along roads.

An object of this invention is to provide an epicyclic gear unit for connection with the output side of a change speed gearing, said unit having a dual clutch arrangement which is simple in construction and operation and is inherently incapable of being "locked up."

The object of the invention is to combine an epicyclic gear with a conventional change-speed gear, and to provide means for controlling the epicyclic gear so that the combination makes available three speed ranges each consisting of a number of gear ratios selectable at the will of the driver of the tractor.

Other objectives and advantages of this invention will become more apparent as this disclosure progresses reference being had to the accompanying drawing in which Figure 1 is an elevational view in section with certain parts removed or broken away for the sake of clarity in the drawing.

Referring more particularly to the drawing, the shaft 10 is engine driven and has a pinion 11 at its rear end in constant mesh with the gear 12. The shaft 10 is suitably mounted by the ball-bearing assembly 13. The gear 12 is secured to hollow shaft 14 for continuous rotation therewith. The hollow shaft 14 is rotatably mounted in bearing assemblies 15, 16 which are located in the walls 17, 18 respectively of the transmission housing 19. The hollow lay shaft has formed integrally therewith gear members 22, 23 and 24. The main shaft 26 is rotatably mounted in walls 17, 18 by means of the bearing assemblies 28, 29. The compound gear member 31 is slideably splined on shaft 26 and has gear elements 32, 33 which mesh respectively with the gear elements 23, 24 of the hollow shaft 14. Also, slideably secured to shaft 26 is the gear member 35. The compound gear 31 and gear 35 are operatively connected with the control handle 38 in the conventional manner by means of the shifting forks 39 (only one shown) which are slideably mounted on the slide rods 40. The change speed gearing thus located between walls 17, 18 is conventional and of course may consist of various gear ratio combinations.

The output shaft 42 of the entire assembly extends rearwardly and is connected with the conventional differential gear (not shown) of the tractor. The epicyclic gear unit, designated generally by the number 44 is located between the main shaft 26, which is the input shaft to the epicyclic unit, and the output shaft 42. Reduced portion 45 of the main shaft 26 forms a spigot on which is piloted the forward end of output shaft 42. Rotatably mounted on spigot 45 is the sungear 47 having teeth 48 around its periphery. The annulus ring 50 is permanently located against the rotation within the housing by any appropriate means. The planet carrier 49 comprises a pair of space rings 51, 52 which are interconnected by bolts 53, each bolt penetrating a spacing sleeve 54.

Thus, by having several such bolts and sleeves (one only of each is shown) the rings 51, 52 form a rigid cage. The planet carrier 49 also includes a number of journal pins 55, there being four of these in the embodiment shown, each pin bridging the rings 51, 52 and providing a support for one of four toothed planet wheels 56.

The main shaft 26 and the output shaft 42 have clutch devices by which the components of the epicyclic gear unit can be controlled as follows.

The clutch device with which the shaft 26 is provided is slideably fitted on a portion of this shaft 26 having long clutch teeth 57, this device comprising an elongated sleeve portion 58 with internal clutch teeth 59 permanently engaging the teeth 57. The sleeve 58 has a ring of external clutch teeth 60. The purpose of the clutch device 59—60 is to connect the gearbox mainshaft 26 with either the sunwheel 47 or with the planet carrier 49 alternatively. Therefore, the sunwheel has a ring of clutch teeth 62 on its side adjacent the clutch 59—60 and the planet carrier 49 has a ring of clutch teeth 63 to mate with the adjacent rings of clutch teeth 59 and 60 respectively. The clutch device 59—60 is slideable under the control of a fork 65 to clutch the shaft 26 either to the sunwheel 47 or the planet carrier 49 (as shown).

It will be noted that the sunwheel 47 is provided with annular recesses 47a and 47b in its opposite side walls. These recesses permit the general axial shortening of the epicyclic transmission, in combination with the shortening inherent in the axially aligned shafts 26 and 42, with the sunwheel 47 positioned between the end walls of the shafts and rotating on the reduced portion 45 of the main shaft. Since the epicyclic transmission is an auxiliary transmission which is associated with the main transmission, it is essential for practical tractor design that the overall length of the transmission be kept to the minimum. When the clutch members 58 and 66 are moved inwardly to engage with the teeth 63 and 72 respectively on the sunwheel 47 the annular recesses 47a and 47b receive the ends of the clutch members. It is thus seen that the overall length of the transmission is held to a smaller dimension, while ample clearance is provided for the clutch teeth which are not engaged at any selected time, insuring that there will be no damaging partial engagement resulting from the shifting of parts due to heavy vibration or the like.

The clutch device with which the output shaft 42 is provided comprises a slideable sleeve 66 having two rings of clutch teeth 67 and 68. The elongated tooth portion comprising teeth 67 permanently engage long clutch teeth 70 on the end portion of the shaft 42 on which the clutch device 66 is slideable. The purpose of this clutch device is to connect the output shaft 42 with either the sunwheel 47 or with the planet carrier 49 alternatively. Therefore the sunwheel 47 and the planet carrier 49 have additional rings of clutch teeth 72 and 73 to mate with the rings of clutch teeth 67 and 68 respectively, which are adjacent thereto. The clutch device 66 is slideable under the control of a fork 75 to clutch the shaft 42 either to the sunwheel 47 (as shown) or the planet carrier 49.

The forks 65 and 75 (each like the fork 39 of the gearbox) are mounted on slide rods and are alternatively engageable by a single hand lever (not shown, but similar to the hand-lever 38). The arrangement is such that the epicyclic gear can be controlled to operate in any of the following ways, namely:

*High range.*—As shown, the gearbox mainshaft 26 is clutched to the planet carrier 49 and the sunwheel 47 is clutched to the output shaft 42. Thus, the planet-wheels 56 roll around the internal gear of the fixed annulus 50 and drive the output shaft 42 at increased speed.

*Medium range.*—The clutch device 59—60 is slid to the left, or rear, so that its teeth 59 engage both rings of teeth 57 and 62 and its teeth 60 disengage the teeth 63. That is to say, there is established a direct drive from the gearbox mainshaft 26 through the clutch device 59—60, the sunwheel 47 and the clutch device 66 to the output shaft 42; and the epicyclic gear is rendered idle.

*Low range.*—With the clutch device 59—60 set in its left-hand position (as for "medium-range" operation) the other clutch device 66 also is slid to the left, so that its teeth 67 continue to engage only the teeth 70 of the output shaft 42, and its teeth 68 move into engagement with the planet-carrier teeth 73. That is to say, the gearbox mainshaft 26 is clutched to the sunwheel 47 and the planet carrier 49 is clutched to the output shaft 42. Thus, the planet wheels 56 roll round the fixed annulus 50 slowly and drive the output shaft 42 at reduced speed.

There is thus provided for a tractor-change-speed gearing, an epicyclic gear having a stationary annulus, a rotatable sunwheel and rotatable planet carrier with at least one planet wheel, a pair of clutch devices slideably engaging said change-speed gearing shaft and said output shaft, respectively, each of said clutch devices having clutch teeth engageable and disengageable with the sunwheel and also having clutch teeth engageable and disengageable with the planet carrier, and means for moving said clutch devices so that the change-speed gearing shaft drives through the planet carrier and the sunwheel to the output shaft to give a high range of speeds, and so that the gearbox shaft drives through the sunwheel and the planet carrier to the output shaft to give a low range of speeds, and also so that the sunwheel or the planet carrier transmits a direct drive between said two shafts to give a medium range of speeds.

Therefore, in the combination according to the example, the epicyclic gear provides three ranges of speeds—namely, high, medium and low—and the change-speed-gearing assembly provides three speed changes for each range. That is to say, the combination provides nine gear ratios.

In the drawings, only forward driving gears are shown. It will be obvious that, in actual practice, the gearbox as is customary will also incorporate reversing gears.

It will be manifest that the change-speed gearing described attains the object of the invention and that nevertheless, despite the large number of gear ratios available, the construction is simple and compact and will be capable of economic manufacture on a commercial scale.

What is desired to be secured by Letters Patent, is:

1. In a transmission, an input shaft; an output shaft rotatably mounted on said input shaft and coaxial therewith; an epicyclic gear unit between said input and output shafts, comprising, a sungear rotatably mounted on said input shaft, a fixed annulus around said sungear and having an internal gear, a rotatable planet carrier having planets which mesh with said sungear and said internal gear, the adjacent ends of said input and output shafts having external splines, a clutch having an elongated internal spline portion slidably meshed with the splines of each shaft for continuous engagement therewith, said clutches also having external teeth, external clutch teeth on either side of said sungear adapted to be engageable with the internal splines of their adjacent clutch, internal clutch teeth on either side of said planet carrier adaptable to be engaged by the external teeth of their adjacent clutch, said clutches being so constructed so as to be selectively engageable with said sungear or said planet carrier, and means to shift said clutches.

2. In a transmission, an input shaft; an output shaft rotatably mounted on said input shaft and coaxial therewith; an epicyclic gear unit between said input and output shafts, comprising, a sungear rotatably mounted on said input shaft, a fixed annulus around said sungear and having an internal gear, a rotatable planet carrier having planets which mesh with said sungear and said internal gear, the adjacent ends of said input and output shafts having external splines, a clutch having an elongated internal spline portion slidably meshed with the splines of each shaft for continuous engagement therewith, said clutches also having external teeth, external clutch teeth on either side of said sungear adapted to be engageable with the internal splines of their adjacent clutch, internal clutch teeth on either side of said planet carrier adaptable to be engaged by the external teeth of their adjacent clutch, said clutches being so constructed as to be selectively engageable with said sungear or said planet carrier, said sungear further having annular recesses in the opposite side faces thereof to receive the inner ends of said clutches when said clutches are selectively moved into engagement with said sungear, and means to shift said clutches.

References Cited in the file of this patent

UNITED STATES PATENTS

| | | |
|---|---|---|
| Re. 20,846 | Dodge | Sept. 6, 1938 |
| 443,259 | Pedersen | Dec. 23, 1890 |
| 1,509,498 | Starr | Sept. 23, 1924 |
| 2,066,873 | Barnes | Jan. 5, 1937 |
| 2,185,538 | Burtnett | Jan. 2, 1940 |
| 2,601,151 | Keller | June 17, 1952 |

FOREIGN PATENTS

| | | |
|---|---|---|
| 725,364 | Great Britain | Mar. 2, 1955 |